Figure 1:
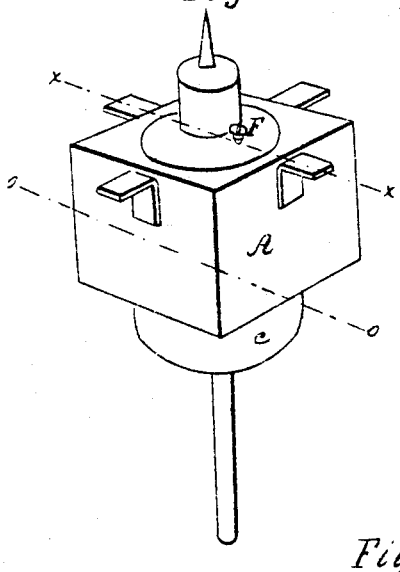
Figure 5:
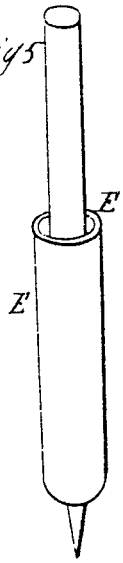
Figure 4:
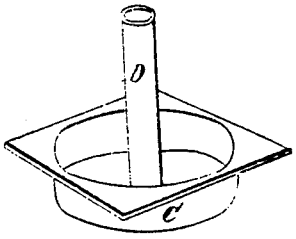
Figure 2:
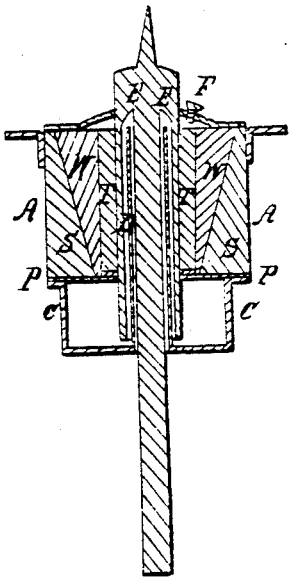
Figure 3:
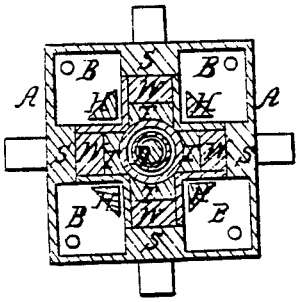

NO PRINTED SPECIFICATION AVAILABLE.

E. W. Nash.

BEST AVAILABLE COPY

Mill Spindle.

AI No. 30.

(A1) Patented Feb. 18. 1840.

A. HOYT & CO. PHOTO-LITHOGRAPHER, WASHINGTON, D. C.